Sept. 11, 1962

HIROSHI ITO ETAL 3,053,136

COMBINED RANGE AND VIEW FINDER WITH
DIFFERENT SIZE IMAGE FIELDS
Filed Aug. 22, 1957

INVENTORS HIROSHI ITO
KEIZO YAMAJI
BY
ATTORNEY

United States Patent Office 3,053,136
Patented Sept. 11, 1962

3,053,136
COMBINED RANGE AND VIEW FINDER WITH DIFFERENT SIZE IMAGE FIELDS
Hiroshi Ito and Keizo Yamaji, Tokyo, Japan, assignors to Canon Camera Company, Inc., Tokyo, Japan, a corporation of Japan
Filed Aug. 22, 1957, Ser. No. 679,713
Claims priority, application Japan Oct. 30, 1956
3 Claims. (Cl. 88—1.5)

The present invention relates to a combined range and view finder and more particularly to such a finder utilizable for a diversity of image field sizes.

The combined range and view finder for a wide range of different sized fields according to the present invention comprises an inverse Galilean optical system and a concave mirror reflex view or Albada finder optical system which are interchangeably disposed in the view finding principal light path beyond a semi-transparent mirror, for the range finding light beam, diagonally positioned in the principal light path, and a mark finder optical system disposed in the range finding beam viewable through the concave mirror reflex view finder optical system, which are utilizable for a wide range of image fields; with the field viewed through the inverse Galilean optical system being that corresponding to an ultra-wide angle interchangeable objective lens, the field viewed through the concave mirror reflex view finder optical system corresponding to that of an intermediate wide angle interchangeable objective lens, and the field viewed through the mark finder optical system corresponding to that for a narrower angle interchangeable objective lens.

It is an object of the present invention to provide a universal combined range and view finder for use with various interchangeable objective lenses ranging from ultra-wide angle objectives down to telephoto objectives and particularly to afford full utilization of the light beam for range finding, and yet of a compact, overall relatively small size as the result of eliminating the disadvantage of the otherwise necessary enlargement of the mask frame for the mark finder optical system by providing a finder for wide angle objective lens in addition to the mark finder optical system.

Figure 1:
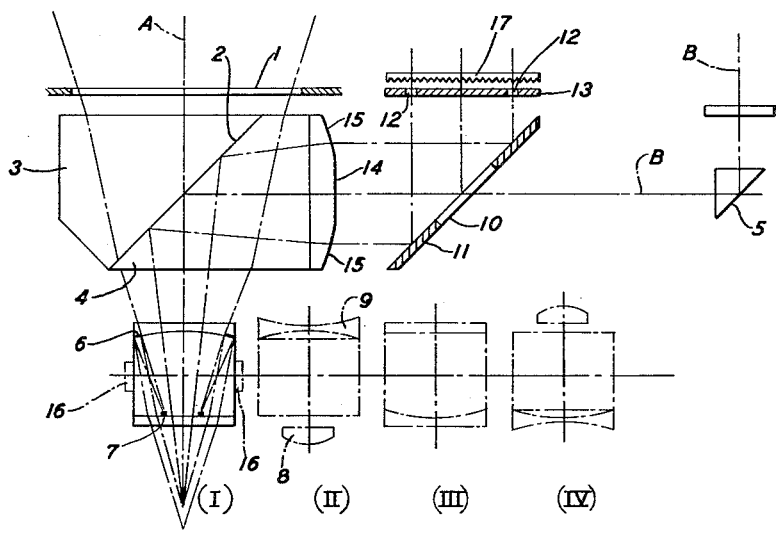
Figure 2:
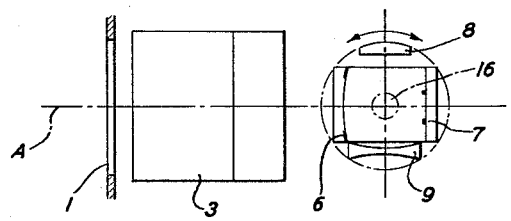

A clearer concept of the scope and purpose of the present invention may be obtained from the following description, taken in connection with the attached drawing, in which:

FIG. 1 is a plan view of the combined range and view finder according to the present invention, and FIG. 2 is a side elevation thereof.

Referring to the drawing, 1 is the objective aperture of the combined range and view finder. 2 is a semi-transparent mirror diagonally positioned to intersect the principal light beam, shown by the chain line A, passing through objective aperture 1. 3 and 4 are prisms having semi-transparent mirror 2 on their respective cemented inner surfaces. 5 is a reflector or a total reflection mirror provided to produce a range finding light beam, shown by the chain line B, falling upon semi-transparent mirror 2. In the arrangement according to the present invention, there are interchangeably provided a concave mirror reflex view finder optical system of the type hitherto known as the Albada finder optical system, having a frame-shaped concave reflecting mirror 6 and a bright frame 7, and an inverse Galilean optical system comprising a convex lens 8 and a concave lens 9, beyond prism 4 having semi-transparent mirror 2 and in the path of the principal light beam. In the range finding light beam B, there is provided a diagonally positioned, framelike reflecting mirror 11 defining a central aperture 10 to permit passage of range finding light beam B therethrough.

By the structural combination of a mask frame 13 having a bright frame 12 centered relative to and corresponding with framelike reflecting mirror 11, and a convex lens 15 having a planar surface 14 at its central region, a well known mark finder optical system is provided to form an image through bright frame 12 superimposed in the image field of the finder. By selectively determining the adequate field out of the several fields of the above mentioned three optical systems, an adequate ultra-wide angle interchangeable objective of the selected field is used for the inverse Galilean optical system, and an adequate proximate wide angle interchangeable objective of the selected field is used for the concave mirror reflex view (the Albada) finder optical system, and an adequate interchangeable objective of a narrower angular field is used for the mark finder optical system. It should be noted that mask frame 13 of the mark finder optical system may be preferably provided with a plurality of concentric bright frames in a range of relatively narrow angular fields to correspond to various interchangeable objectives in such a manner that the bright frames may be interchanged as needed, or alternatively, be adjustably enlarged or reduced as required. So that the Albada optical system and the inverse Galilean optical system may be interchanged with each other, the elements of the two optical systems are rigidly positioned in a combination, such as a turret, so that the respective optical axes thereof intersect each other and a support shaft 16 at right angles to both optical axes is provided to rotatably support the two optical systems. 17 is a frosted glass plate disposed at the front of mask frame 13.

In the combined range and view finder according to the present invention, the oncoming light rays in the principal light beam A for the view finder, and the incident light rays in the range finding light beam B reflected from reflector 5 and semi-transparent mirror 2 function in common as a range finder. When the Albada finder optical system is in alignment with the optical path of the view finding beam A, as shown in FIG. 1 (I), the light rays are reflected from bright frame 7 and further reflected from framed concave reflecting mirror 6, thereby permitting the image through bright frame 7 to form in the field of view at the front thereof a superimposed image, thus producing a field adequately corresponding to an interchangeable objective of a relatively wide angular field. Furthermore, the light rays oncoming through bright frame 12 of the mark finder optical system are reflected by frame-like reflecting mirror 11 and semi-transparent mirror 2, and means of convex lens 15 are caused to merge with the view finding principal light beam A. Thus, through bright frame 12 an image is formed in the field of view of the finder as a superimposed image in the path of such incident rays. This image occupies the predetermined field of the interchangeable camera objective having a relatively narrow angular field. It should be noted that in this arrangement of the mark finder optical system, by appropriately interchanging bright frame 12 according to the desired dimensions, the image field can readily be changed in accordance with the desired dimension.

When the Albada finder optical system is replaced by the inverse Galilean optical system in the light path, as shown in FIG. 1 (II), there is produced a field of view corresponding to a reduced image of the wide angular field thereby producing a field of a wider angle interchangeable objective in comparison with that when using the Albada finder optical system. The inverse Galilean optical system and the Albada finder optical system being rotatably supported in common, as will be recalled, may alternatively be used interchangeably in precisely the inverse positions just described. Thus, when these two optical systems are rotated on their common shaft to the position shown in FIG. 1 (III), the image through bright frame 7 of the Albada finder optical system disappears from the field of view, thereby rendering the image through bright frame 12 of the mark finder optical system exclusively viewable by the observer. This kind of arrangement is extremely convenient to have a distinct view. Furthermore, when these two optical systems are rotated on their common shaft to the position shown in FIG. 1 (IV), the image formed is an enlarged shape of a relatively narrower angular field thereby applicable to the exclusive use of range finding with a remarkable efficiency.

In conventional combined range and view finders wherein the prior known mark finder optical system is utilized by providing a mask frame in its range finding light beam to correspond to the desired field of view, thereby forming an image of the angle of view superimposed on a field of view of the principal light beam, it is absolutely necessary to prepare in advance a plurality of bright frames of various dimensions on the mask frame, thereby obtaining correspondence with the diverse fields of view of numerous interchangeable objectives by the interchangeable utilization thereof. However, this kind of arrangement suffers from the inherent defect, particularly for wide angle objectives, in that a mask frame of abnormally large dimensions is needed which is much too bulky to be incorporated within the camera body. On the other hand a mask frame of relatively small dimensions structurally reduces the dimension of the central aperture of the framelike reflecting mirror corresponding to the mask frame to an extremely small aperture, with the result that the range finding light beam cannot satisfactorily be directed in sufficient amount. Thus, such arrangements are inevitably restricted to an interchange function to a remarkably limited extent. Whereas in the present invention, an inverse Galilean optical system and an Albada finder optical system are also provided interchangeably beyond, in the direction of the light, the semi-transparent mirror in the principal light beam of the view finder in addition to a mark finder optical system in the range finding light beam resulting in an optical structure and performance that any field may be selectively made in accordance with the corresponding angular field of various kinds of interchangeable objectives of either ultra-wide angle, intermediate wide angle, or a relatively narrower angle by means of corresponding utilization of any one of the three optical systems It is an advantage of the present invention to provide a combined range and view finder of universal performance applicable to a remarkably wide range of the angle of view between ultra-wide angle and relatively narrower angular fields It is another advantage of the present invention that a wide angle finder is detachable from the mark finder optical system thus eliminating the defect of necessarily enlarged mask frames for the mark finder optical system whereby an overall structure of compact and relatively small size is obtained It is a further advantage of the present invention to utilize the totality of the range finding light beam in a satisfactory way to provide an excellent universal combined range and view finder

What is claimed is

1. A universal combined bright frame, range and view finder for cameras with interchangeable lenses of differing focal lengths comprising a first entry window for producing a range finder light beam from an object to be photographed, a second entry window for producing a bright frame light beam from such object and a third entry window for producing a view finder light beam from such object, a total reflector diagonally positioned in the path of the range finder light beam, a first bright frame mask positioned in the path of the bright frame light beam, a totally reflecting mirror defining a central aperture aligned with the first bright frame mask and diagonally positioned in the first bright frame light beam, the central aperture being of such dimensions and so positioned as to pass all the range finder light beam reflected from the total reflector, a cemented biprism positioned in the range and view finder beams and having a semi-transparent mirror at its cemented interface upon which light of the range finder beam reflected from the total reflector and light from the bright frame beam reflected from the totally reflecting mirror is incident and from which such beams are reflected merged with the view finder beam, an Albada optical system including a second bright frame mask, a Galilean optical system, and a rotatable support on which the Albada and the Galilean systems are mounted with optical axes at right angles to each other, the support being positioned behind the biprism in alignment with the view finder beam and rotatable such that but one of the optical systems is in the view finder beam path in image forming relation, the apparent size of the first bright frame mask when using the Galilean optical system in its forward position being smaller than the apparent size of such bright frame using the Albada optical system with such second bright frame mask effective, and both apparent frame sizes being smaller than the real field of view with the Galilean system used in its inversed position 2 A universal combined range finder according to claim 1 in which a positive lens is positioned in the path of light reflected from and passing through the centrally apertured totally reflecting mirror between the totally reflecting mirror and the semi-transparent mirror, the central region of the positive lens having parallel faces of an area sufficient to pass all the light passing through the central aperture of the wholly reflecting mirror, and the peripheral region of the lens surface beyond such central lens region is of such curvature as to focus the bright frame in the finder image field 3. A universal combined range and view finder according to claim 1 in which the Galilean optical system in its inverse position in the viewing beam is of a magnifying power to product an image field in the finder corresponding to that of an ultra-wide angle photographic objective, the Albada optical system in such beam producing a finder image field corresponding to that of an intermediate wide angle photographic objective, and the bright frame producing an image field in the finder with the Albada system in its reverse position in the beam corresponding to relatively narrow angle photographic objectives.

References Cited in the file of this patent

UNITED STATES PATENTS

| 2,552,940 | Cornut | May 15, 1951 |
| 2,805,608 | Leitz et al. | Sept. 10, 1957 |
| 2,896,500 | Kakunodate | July 28, 1959 |

FOREIGN PATENTS

| 996,990 | France | Sept. 5, 1951 |
| 657,348 | Germany | Mar. 2, 1938 |